Figure 1:
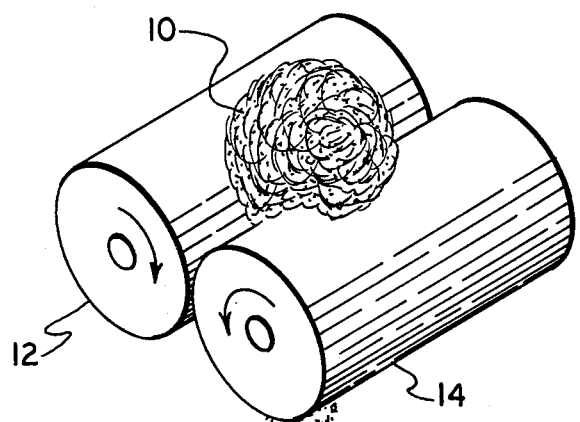
Figure 2:
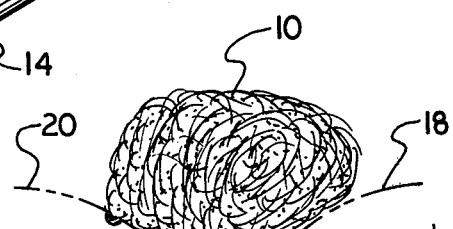
Figure 3:
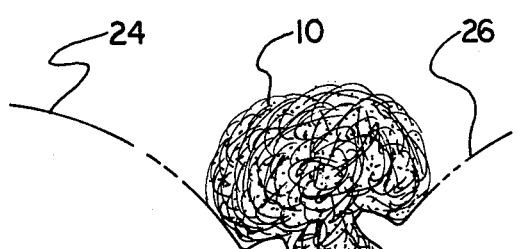

United States Patent [19]

Hollaway, Jr.

[11] 4,151,129
[45] Apr. 24, 1979

[54] METHOD FOR DISPERSING COTTON FILTER FLY IN AN ELASTOMERIC COMPOSITION

[75] Inventor: Gerald C. Hollaway, Jr., Springfield, Mo.

[73] Assignee: Dayco Corporation, Dayton, Ohio

[21] Appl. No.: 866,587

[22] Filed: Jan. 3, 1978

[51] Int. Cl.² .......................... C08L 1/02; C08L 9/00
[52] U.S. Cl. .......................... 260/17.4 BB; 19/65 CR; 260/17.4 CL
[58] Field of Search ................ 260/17.4 CL, 17.4 BB; 19/65 CR

[56] References Cited

U.S. PATENT DOCUMENTS

| | | | |
|---|---|---|---|
| 2,094,868 | 10/1937 | Baxter | 260/17.4 CL |
| 3,003,195 | 10/1961 | Varga | 19/65 CR |
| 3,275,580 | 9/1966 | Battista | 260/17.4 CL |
| 3,907,729 | 9/1975 | Burkey | 260/17.4 CL |
| 3,943,079 | 3/1976 | Hamed | 260/17.4 BB |
| 4,021,594 | 3/1977 | Godfrey | 260/17.4 CL |

FOREIGN PATENT DOCUMENTS 805305 12/1958 United Kingdom .......................... 19/65

OTHER PUBLICATIONS

Textile Bulletin, Jul. 1965, pp. 39–40, "Pressure and Cotton Fibers", Honold et al.
Rubber Age, Sept. 1950, pp. 687–690, "Basic Effects of Wood Cellulose as a Filler in Rubber", Goodloe et al.

*Primary Examiner*—Edward M. Woodberry
*Attorney, Agent, or Firm*—Reuben Wolk

[57] ABSTRACT

The dispersibility of cotton filter fly in an elastomeric composition is greatly improved by applying point contact compressive force to the filter fly prior to mixing it into the elastomer.

17 Claims, 3 Drawing Figures

U.S. Patent  Apr. 24, 1979  4,151,129

METHOD FOR DISPERSING COTTON FILTER FLY IN AN ELASTOMERIC COMPOSITION

This invention relates to a method for dispersing cotton filter fly in an elastomeric composition.

BACKGROUND OF THE INVENTION

Cotton filter fly is a waste product accumulated in various locations in a cotton mill. It can be and is accumulated, for example, in the screen over condensors in the card room, in a filter box from the card room or picker room, and in air conditioning screens located in any of the processing areas of a cotton mill. It comprises a mixture of short cotton fibers and any airborne material, such as dust, leaf particles and the like, which might accumulate at the above-mentioned collection points. The filter fly is collected from the collection points, combined and compressed into a bale. It is commonly used as a mattress stuffing material.

Rubber compositions reinforced with fibers are well known in the art. The reinforcing fibers commonly include natural and synthetic fibers, such as cotton, rayon, nylon, polyester and the like.

Due to its low cost, it would be desirable to use cotton filter fly as a reinforcement for rubber compositions. In practice, however, cotton filter fly clumps together and is relatively impossible to disperse it uniformly throughout the rubber composition.

It has now been found that the dispersion of cotton filter fly in a rubber composition can be improved by crushing the cotton filter fly before adding it to the rubber composition.

Accordingly, it is an object of this invention to provide a method for dispersing cotton filter fly in a rubber composition.

Another object of this invention is to provide a rubber composition comprising cotton filter fly as reinforcement therefor.

Other objects, aspects and advantages of the present invention will be apparent to those skilled in the art from a reading of the following detailed description, the attached drawing and the appended claims.

SUMMARY OF THE INVENTION

In accordance with the present invention there is provided a method for improving the dispersibility of cotton filter fly in an elastomeric composition which comprises applying point contact compressive force to the filter fly and thereafter recovering the dispersible product.

More particularly, the method of this invention comprises passing cotton filter fly between means for applying point contact compressive force and recovering the resulting dispersible product.

There is further provided a method for producing an elastomeric composition comprising cotton filter fly dispersed relatively uniformly therethrough which comprises applying point contact compressive force to the cotton filter fly prior to adding the cotton filter fly to the rubber composition.

Additionally there is provided an elastomeric composition reinforced with cotton filter fly.

DETAILED DESCRIPTION OF THE DRAWING

In the drawing,

FIG. 1 illustrates the method of this invention wherein cotton filter fly is passed through two closely spaced rollers;

FIG. 2 illustrates the rollers in greater detail wherein one roller has transverse grooves; and FIG. 3 illustrates an alternative embodiment wherein two closely spaced gears are employed.

DETAILED DESCRIPTION OF THE INVENTION

Referring now to the drawing, the method of this invention comprises passing cotton filter fly 10 between closely spaced counter-rotating rollers 12 and 14 thereafter recovering the resulting dispersible filter fly 16. The rollers 12 and 14 are set a distance apart which will allow the filter fly to pass therebetween, but as closely spaced as possible. This distance must be determined in practice due, inter alia, surface variations in the rollers. The rollers 12 and 14 are preferably made of a hardened ferrous metal. The closely spaced, counter-rotating rollers 12 and 14 can be smooth, as shown in FIG. 1, or one as both rollers can be slightly roughened, as shown in FIG. 2, wherein the roller 18 is smooth and the roller 20 has grooves 22 parallel to the longitudinal axis of the roller and across the entire face thereof. The rollers 12 and 14, or 18 and 20, can be rotated at the same speed in opposite direction, or at different speeds.

It is also within the scope of this invention to render the filter fly more dispersible in rubber by passing the filter fly 10 between closely spaced meshing gears 24 and 26, as shown in FIG. 3.

The dispersible filter fly 16 can be dispersed in any elastomeric material, known in the art, including rubber, synthetic plastic materials, and the like, and mixtures thereof.

The dispersible filter fly can be dispersed in the elastomeric composition in an amount ranging from 0.5 to about 40 parts per 100 parts of rubber.

Various components such as vulcanizing agents, extender oil, carbon black, accelerators, antioxidants, antiozonants and the like can also be dispersed in the elastomeric composition. Such components and their proportions are well known in the art and will not be further discussed for the purpose of brevity.

The dispersible filter fly 16 and the other additives are incorporated into the elastomeric material using conventional rubber compounding techniques and equipment. Any suitable apparatus such as a roll mill or Banbury mixer which will intimately mix the elastomeric material, filter fly and other additives can be used. Mixing is carried out at a temperature for a time sufficient to intimately mix the ingredients. The order of mixing, temperature and times are well known in the art and will not be further discussed for the purpose of brevity.

Reasonable variations and modifications which will be apparent to those skilled in the art, can be made in this invention without departing from the spirit and scope thereof.

I claim:

1. A method for rendering cotton filter fly dispersible in an elastomeric composition which comprises the steps of applying point contact compressive force to said filter fly and thereafter recovering the resulting dispersible product.

2. The method of claim 1 wherein said force is applied by passing said filter fly between means for applying said force.

3. The method of claim 2 wherein said means comprises a pair of counter-rotating rollers.

4. The method of claim 3 wherein said rollers are made of a ferrous metal.

5. The method of claim 3 wherein at least one of said rollers has an irregular surface.

6. The method of claim 3 wherein said rollers rotate at the same speed.

7. The method of claim 3 wherein said rollers rotate at different speeds.

8. The method of claim 2 wherein said means comprises a pair of meshing gear teeth.

9. A method for producing an elastomeric composition having cotton filter fly dispersed therethrough which comprises passing cotton filter fly between means for applying point contact compressive force to said filter fly, recovering the resulting dispersible product, intimately mixing from 0.5 to about 40 parts of said dispersible product with 100 parts of an elastomer and thereafter recovering the resulting elastomeric composition having said filter fly dispersed therethrough.

10. The method of claim 9 wherein said elastomer is rubber.

11. The method of claim 9 wherein said means comprises a pair of counter-rotating rollers.

12. The method of claim 11 wherein at least one of said rollers has an irregular surface.

13. The method of claim 11 wherein said rollers rotate at the same speed.

14. The method of claim 11 wherein said rollers rotate at different speeds.

15. The method of claim 9 wherein said means comprises a pair of meshing gear teeth.

16. An elastomeric composition comprising an elastomer reinforced with cotton filter fly wherein said filter fly is uniformly dispersed therethrough and wherein the amount of said filter fly ranges from 0.5 to about 40 parts per 100 parts of said elastomer.

17. The composition of claim 16 wherein said elastomer is rubber.

* * * * *